(12) United States Patent
Bansal et al.

(10) Patent No.: US 7,246,303 B2
(45) Date of Patent: Jul. 17, 2007

(54) ERROR DETECTION AND RECOVERY OF DATA IN STRIPED CHANNELS

(75) Inventors: Akash Bansal, Sunnyvale, CA (US); Jaisimha Bannur, Sunnyvale, CA (US); Anujan Varma, Santa Cruz, CA (US)

(73) Assignee: Intel Corporation, Santa Clara, CA (US)

( * ) Notice: Subject to any disclaimer, the term of this patent is extended or adjusted under 35 U.S.C. 154(b) by 430 days.

(21) Appl. No.: 10/396,177

(22) Filed: Mar. 24, 2003

(65) Prior Publication Data

US 2004/0017778 A1 Jan. 29, 2004

Related U.S. Application Data

(60) Provisional application No. 60/367,630, filed on Mar. 25, 2002.

(51) Int. Cl.
*F06F 11/00* (2006.01)
*G01R 31/28* (2006.01)
*H03M 13/00* (2006.01)

(52) U.S. Cl. ............... 714/800; 714/704; 714/760; 714/712

(58) Field of Classification Search .......... 714/800, 714/758, 752; 375/260
See application file for complete search history.

(56) References Cited

U.S. PATENT DOCUMENTS

| | | | |
|---|---|---|---|
| 4,092,732 A | 5/1978 | Ouchi | |
| 4,331,956 A | 5/1982 | Anderson | |
| 4,335,458 A | 6/1982 | Krol | |
| 4,695,999 A | 9/1987 | Lebizay | |
| 4,775,987 A | 10/1988 | Miller | |
| 5,065,396 A | 11/1991 | Castellano et al. | |
| 5,127,000 A | 6/1992 | Henrion | |
| 5,191,578 A | 3/1993 | Lee | |
| 5,260,935 A | 11/1993 | Turner | |
| 5,274,785 A | 12/1993 | Kuddes | |
| 5,442,752 A | 8/1995 | Styczinski | |
| 5,483,523 A | 1/1996 | Nederlof | |
| 5,581,566 A * | 12/1996 | St. John et al. ............. 714/757 |
| 5,649,157 A | 7/1997 | Williams | |
| 5,682,493 A | 10/1997 | Yung | |
| 5,832,278 A | 12/1998 | Young | |
| 5,848,434 A | 12/1998 | Young | |
| 5,859,835 A | 1/1999 | Varma | |
| 5,860,097 A | 1/1999 | Johnson | |
| 5,978,951 A | 11/1999 | Lawler | |

(Continued)

FOREIGN PATENT DOCUMENTS

JP  408163091 A  6/1996

*Primary Examiner*—Phung My Chung
(74) *Attorney, Agent, or Firm*—Douglas J. Ryder; Ryder IP Law, PC

(57) ABSTRACT

In general, in one aspect, the disclosure describes an apparatus that includes a transmission module to split a data segment into a plurality of data stripes and transmit each data stripe over an associated data channel. The plurality of data channels are organized into at least one group and each group has an associated parity channel to transmit a parity stripe generated based on the data stripes within the group. The apparatus also includes a reception module to receive the plurality of data stripes and the at least one parity stripe. The apparatus further includes a controller to control the operation of the apparatus.

37 Claims, 11 Drawing Sheets

U.S. PATENT DOCUMENTS

| | | |
|---|---|---|
| 6,055,625 A | 4/2000 | Nakada |
| 6,061,345 A | 5/2000 | Hahn |
| 6,167,508 A | 12/2000 | Farrell |
| 6,170,032 B1 | 1/2001 | Izzard |
| 6,188,698 B1 | 2/2001 | Galand |
| 6,282,686 B1 * | 8/2001 | Cypher ..................... 714/758 |
| 6,321,306 B1 | 11/2001 | Arimilli |
| 6,359,891 B1 | 3/2002 | Bergantino |
| 6,408,378 B1 | 6/2002 | O'Connor |
| 6,934,904 B2 * | 8/2005 | Talagala et al. ............ 714/770 |
| 7,171,594 B2 * | 1/2007 | Wyatt et al. ................ 714/704 |
| 2002/0039388 A1 * | 4/2002 | Smart et al. ................ 375/260 |
| 2004/0107398 A1 * | 6/2004 | Johnson ..................... 714/758 |

* cited by examiner

W = BYTES
M = DATA CHANNELS

| BYTE # | DATA CHANNEL | GROUP # |
|---|---|---|
| 0, M, •••, (W/M−1)M | 0 | 0, 1, •••, M−1 |
| 1, M+1, •••, (W/M−1)M+1 | 1 | 0, 1, •••, M−1 |
| •••, •••, ••• | ••• | ••• |
| M−1, 2M−1, •••, ((W/M)M−1=W−1 | (W/M)−1 | 0, 1, •••, M−1 |

FIG. 2A

26 BYTES, 6 CHANNELS

| BYTE # | DATA CHANNEL # | GROUP # |
|---|---|---|
| 0, 6, 12, 18, 24 | 0 | 0, 1, 2, 3, 4 |
| 1, 7, 13, 19, 25 | 1 | 0, 1, 2, 3, 4 |
| 2, 8, 14, 20 | 2 | 0, 1, 2, 3 |
| 3, 9, 15, 21 | 3 | 0, 1, 2, 3 |
| 4, 10, 16, 22 | 4 | 0, 1, 2, 3 |
| 5, 11, 17, 23 | 5 | 0, 1, 2, 3 |

FIG. 2B

| DATA CHANNEL 0 | DATA CHANNEL 1 | DATA CHANNEL 2 | PARITY |
|---|---|---|---|
| 00101111 | 01100001 | 01101101 | 00100011 |

FIG. 3

ERROR DETECTION AND RECOVERY OF DATA IN STRIPED CHANNELS

This application claims priority under 35 U.S.C. §119(e) of U.S. Provisional Application No. 60/367,630 entitled "Error Detection and Correction of Data Striped Over Multiple Serial Channels" filed on Mar. 25, 2002 which is herein incorporated by reference, but is not admitted to be prior art.

BACKGROUND

High-speed store-and-forward devices, such as switches and routers, used in today's communication networks have a large amount of data passing through them. These devices typically include a set of line cards, which perform various operations within the communication networks. Communication between these line cards usually takes place over a backplane, which provides connectivity among the line cards, e.g., via dedicated point-to-point or switched communication paths. With advances in serial communication technologies, the preferred choice for high-speed backplanes today is to use one or more high-speed serial links (channels). High-speed serial data can be carried over either electrical backplanes or optical backplanes. If an optical backplane is used, the transmitting line card must convert electrical signals to optical signals and send the optical signals over fiber, and the destination line card must receive the optical signals from the fiber and reconvert them to electrical signals. The backplane may be used to switch data between line cards or may transport the data without switching. Serializers and deserializers are used, in conjunction with an encoding scheme, such as 8-bit to 10-bit encoding, to create a self-clocked high-speed serial electrical data stream.

BRIEF DESCRIPTION OF THE DRAWINGS

FIGS. 2A and B illustrate exemplary charts explaining how a frame is striped (interleaved) across data channels, according to one embodiment;

FIG. 3 illustrates an exemplary parity byte calculation, according to one embodiment;

DETAILED DESCRIPTION

Figure 1:
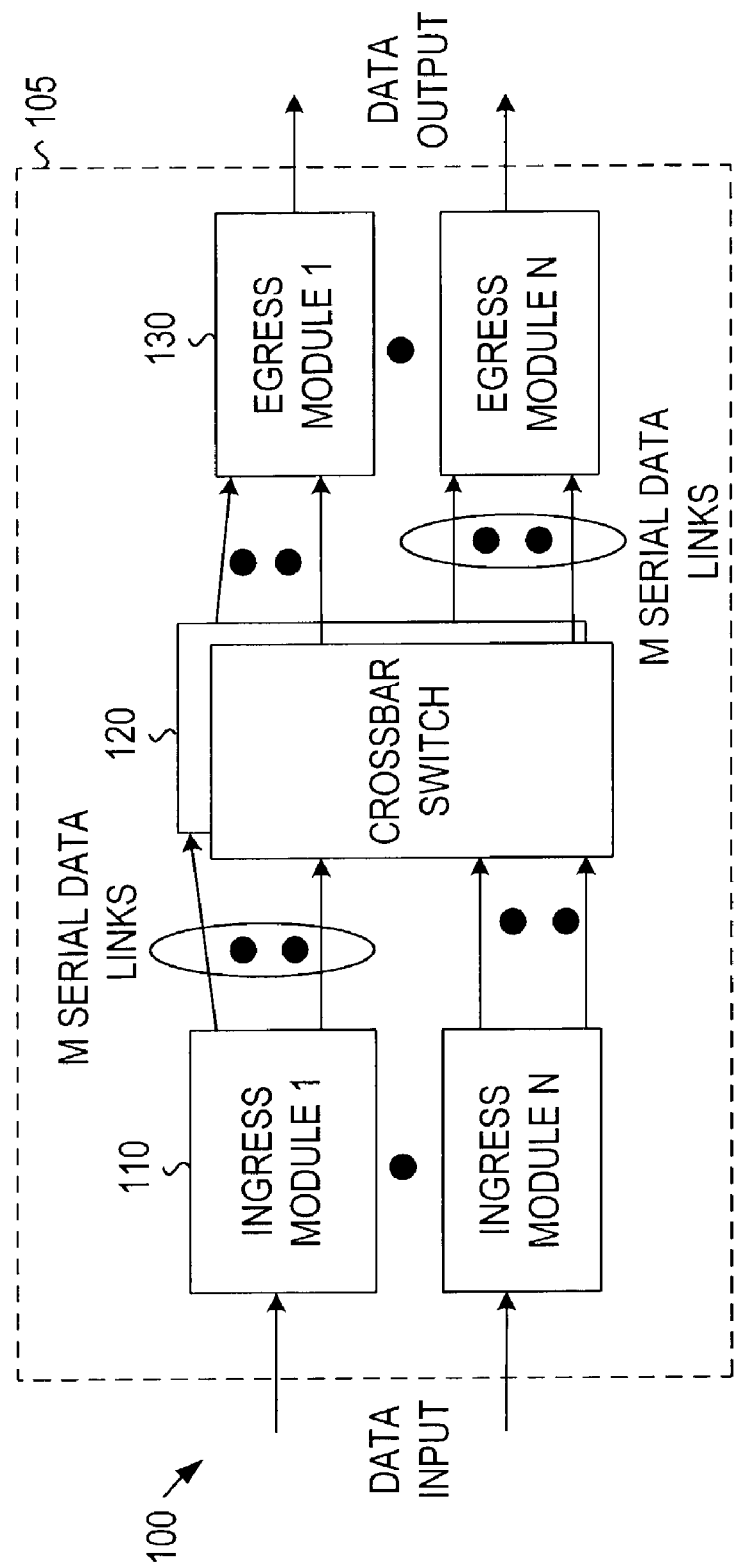
FIG. 1 illustrates an exemplary system having multiple line cards connected through serial links over a point-to-point or switched backplane, according to one embodiment.

FIG. 1 illustrates an exemplary system 100 for transmitting data amongst various sources and destinations. The system may transmit the data using any number of protocols including Asynchronous Transfer Mode (ATM), Internet Protocol (IP), and Time Division Multiplexing (TDM). The data may be sent in variable length or fixed length blocks, such as cells, packets or frames. The communication lines used to transmit data may be fiber, copper, or other mediums. The system includes at least one store-and forward device 105, such as a router or packet switch. The store-and-forward device 105 includes multiple line cards connected together through serial links over a point-to-point or switched backplane. A plurality of ingress modules 110 are connected through a backplane 120 to a plurality of egress modules 130. The backplane 120 may be electrical or optical. The ingress modules 110 and the egress modules 130 are typically two sides of a line card. The line cards may be Ethernet (e.g., Gigabit, 10 Base T), ATM, Fibre channel, Synchronous Optical Network (SONET), and Synchronous Digital Hierarchy (SDH), amongst others. According to one embodiment, the data transmitted over the backplane is broken up into segments (e.g., frames). In a packet switch, the segment includes a single packet or a set of packets sent from a source line card to destination line card. Each segment has a defined maximum length which does not exceed a predetermined maximum length.

In order to meet bandwidth requirements the data (e.g., frames) being transmitted from one card to another card over the backplane is striped over multiple high-speed serial channels between the cards. The multiple serial communication channels are divided into M data channels and K parity channels. The data is striped over the M data channels. Striping is accomplished by breaking the data up and transmitting portions of the data over each of the M channels. For example, if the frame to be striped had W bytes, each channel would transmit W/M bytes. According to one embodiment, a first byte (e.g., byte 0) is transmitted over a first channel (e.g., channel 0), a second byte (e.g., byte 1) is transmitted over a second channel (e.g., channel 1), and so on until an $M^{th}$ byte (e.g., byte M−1) is transmitted over the $M^{th}$ channel (e.g., channel M−1). Once each channel has transmitted a byte, the next byte (e.g., byte M) is transmitted on the first channel (e.g., channel 0). The process is repeated until all W bytes in the frame are transmitted. One way to look at this is that the data is broken up into W/M groups, with each group having M bytes. One byte (of the M bytes) from each group is then transmitted to each data channel (of the M data channels). The bytes belonging to a frame that travel on one specific channel is called a stripe. For example, the sequence of bytes 0, M, 2M, 3M, etc. would make up stripe 0 (e.g., the part of the frame traveling on channel 0). Note that some channels may have fewer than W/M bytes (or may have no data) and that the last group may have less than M bytes.

FIG. 2A illustrates an exemplary chart explaining how a frame including W bytes is striped across M data channels. The first column lists the byte number (0 to W−1), the second column lists the data channel number (0 to M−1) and the third column the group number (0 to (W/M)−1). As illustrated, bytes 0 to M−1 are striped over data channels 0 to M−1 to form a first group (group 0); bytes M to 2M−1 are striped over data channels 0 to M−1 to form a second group (group 1); and so on until bytes ((W/M)−1)M to W−1 are striped over data channels 0 to M−1 to form a last group (group (W/M)−1).

FIG. 2B illustrates an exemplary chart explaining how a frame including 26 bytes is striped (interleaved) across 6 data channels. This example would create 4 groups having 6 bytes each and a fifth group having two bytes. As illustrated, the first six bytes (bytes 0 to 5) are striped over each data channel (channels 0 to 5) to form a first group (group 0); the next six bytes (bytes 6 to 11) are striped over each data channel (channels 0 to 5) to form a second group (group 1); and so on until the last two bytes (bytes 24–25) are striped over the first two data channels (channels 0 and 1) to form a last group (group 4).

The various embodiments are in no way intended to be limited to the striping assignments discussed above. Rather, the bytes can be transmitted over the channels in any order. For example, byte 0 could be assigned to channel (M−1), byte 1 could be assigned to channel (M−2) and so on. Moreover, the various embodiments are not limited to transmitting the data byte by byte. The data could be transmitted bit by bit, sector by sector, block of bytes by block of bytes, or block of bits by block of bits, where a block can be defined by a user. Furthermore, the various embodiments are not limited to receiving frames that are organized as W bytes. Rather the frames could be organized by bits, sectors, or other ways.

Before transmission, a cyclic redundancy code (CRC) is computed for the frame. The CRC is inserted at the end of the frame and is transmitted along with the frame (data). Also, a separate CRC is computed for each stripe and is sent as part of the stripe. The parity channels are used to send parity signals associated with the data being sent. If the data is being striped by bytes then the parity will be transmitted by bytes as well. The parity bytes (or other grouping) are used for correction of errors. As previously noted the multiple serial communication channels are divided into M data channels and K parity channels. The M data channels are divided into groups and each group is associated with a parity channel. As there are K parity channels it follows that there will be K groups of data channels and each group will have M/K channels. For each byte within a group (e.g., M/K channels) there is an associated parity byte in the corresponding parity channel. In a preferred embodiment, each parity byte is generated by XORing (that is, computing the logical Exclusive-OR operation of) each bit of each associated byte in the data channels within the group. For example, bit 0 of the parity byte is the XOR of the bits in position zero of all the bytes in that group, bit 1 is the XOR of the bits in position one of all the bytes in that group, and so on. FIG. 3 illustrates an exemplary parity byte calculation for a group of 3 data channels that are utilized to transmit a plurality of bytes. The parity byte is calculated by XORing each bit of the data bytes.

The various embodiments are in no way intended to be limited to generating the parity data by XORing associated bits together. Rather, there are multiple methods for generating parity data (e.g., bits, bytes, etc.).

Figure 4:
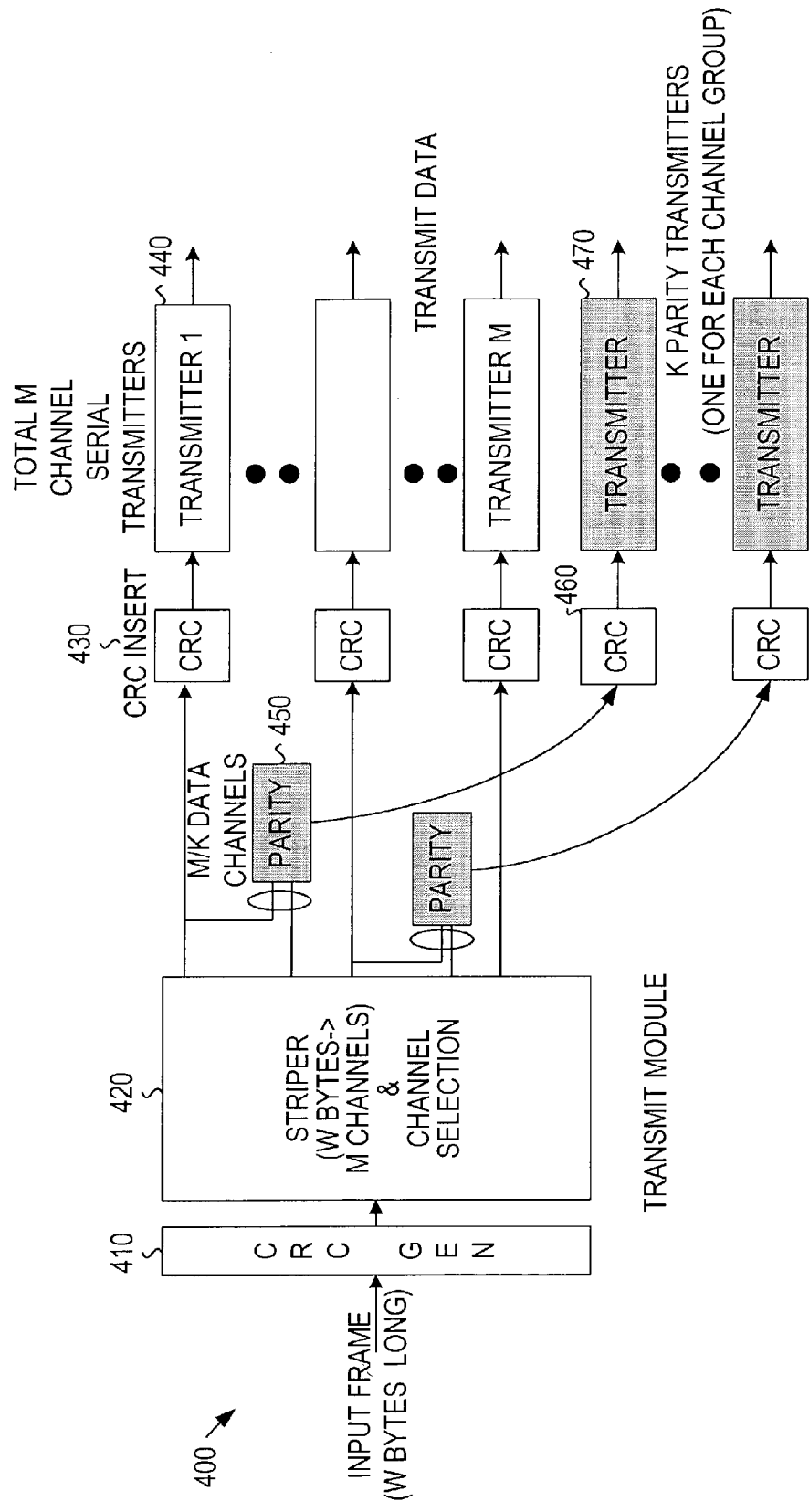
FIG. 4 illustrates an exemplary transmission module, according to one embodiment.

FIG. 4 illustrates an exemplary transmission module 400, according to one embodiment. The transmission module 400 receives an input frame that is W bytes long at a CRC generator 410 that generates a CRC for the entire frame. The entire frame including the CRC is provided to a striper 420. The striper 420 divides the W bytes into M groups and selects the channel for each group to be transmitted over. That is, one group will be transmitted over each of the M channels. A CRC is generated for each stripe and is inserted at the end of the stripe by a CRC module 430. The stripe and the associated CRC for each channel are then provided to a transmitter 440 for transmitting over the backplane. There are a total of M transmitters 440, one for each data channel. The transmission module 400 also includes K parity channels. Each parity channel is associated with a group of M/K data channels. The M/K data channels associated with each parity channel are provided to a parity generator 450 that generates the parity data associated with the group of data channels. As previously mentioned, if the data channels are transmitting data byte by byte the parity data will be a parity byte. In a preferred embodiment, the parity generator 450 is an XOR gate for each bit of the data being transmitted at a time. The XOR gate receives an associated bit from each of the group of M/K data channels. A CRC is generated for each parity stripe and is inserted at the end of the parity stripe by a CRC module 460. The parity stripe and the associated CRC for each parity channel are then provided to a transmitter 470 for transmitting over the backplane. There are a total of K parity transmitters 470, one for each parity channel.

It should be noted that the transmitters 440 and the transmitters 470, as well as the CRC modules 430 and the CRC modules 460, are illustrated separately for convenience of pointing out the difference between the parity channels and the data channels. However, it should in no way be construed to limit the various embodiments to requiring different CRC modules and transmitters for parity channels and data channels. Rather, the CRC modules and the transmitters could be the same. In fact, according to one embodiment, the transmission module 400 can be easily reconfigured to have more data channels or more parity channels.

The data sent over each channel (stripe) is received and buffered and the frame is recreated. A CRC is computed for the entire received frame and compared to the CRC that was transmitted with the frame in order to check for errors in the received frame. In addition, a CRC is computed for each channel (data and parity) and compared to the transmitted CRC for the channel to check for errors in the stripe. If the computed CRC does not match with the transmitted CRC at the end of the stripe, the data within the stripe is deemed to be in error. The CRC error indication for each channel is ORed with an error signal from a corresponding physical receiver device. The physical receiver device indicates errors such as loss of signal etc. The ORed error signal is referred to as a channel error.

If there is channel error on only a single data channel (e.g., error is confined to a single stripe) associated with a group of channels, the data for that channel (stripe) can be recovered. The data for the channel is recovered by XORing the data from all the other channels (data and parity) in the group. The recovered data replaces the received data for that channel (stripe). Once the data is recovered for the errored channel (stripe), the frame is reassembled from all the received channels (stripes) and the corrected channel (stripe). A second CRC check is then performed on the frame. If this CRC check passes, the entire frame is deemed error-free and accepted by the receiver. An error count is incremented for the data channel having the failure. If the error count exceeds some predefined threshold, action may be taken to fix the channel (discussed later).

If there is only a single channel error on a parity channel associated with a group of channels, the received data within the group is processed normally (as if there were no error). An error count is incremented for the parity channel having the failure. If the error count exceeds some predefined threshold, action may be taken to fix the channel (discussed later).

It should be noted that if there is a channel error (data or parity as discussed above) that there should also be a frame level error. If there is a channel error but no frame level error, the frame is discarded and the channel error count is incremented (for the data or parity channel in which the error was detected).

If errors are detected in more than one channel (whether data or parity) in a group, the error is uncorrectable. The frame is then discarded and a frame error counter is incremented. If the error count exceeds some predefined threshold, action may be taken to fix the channel.

If the frame level CRC indicates an error, but there are no channel errors detected in any group, then it is an uncorrectable error. The frame is discarded and a frame error counter is incremented.

The above descriptions apply for each group of channels. The actions in one group are independent of the actions required (or taken) in other groups.

Each channel is provided with a channel-specific error counter and an associated threshold register. When any channel-specific error count exceeds the threshold, there is a provision for an interrupt to the processor (or custom hardware) controlling the system. The software (or custom hardware) would set the value of the threshold such that in a given interval, if the number of interrupts exceed the value specified in the threshold register, it is likely that the channel has a permanent hardware problem. The system may be shut down to replace one or more components to restore full throughput. If the error count does not exceed the threshold in the specified interval, it is likely that any errors that occurred were random in nature and may be ignored. At the end of each specified interval, the channel-specific error counts are reset. Note that the software (or custom hardware), needs to keep a rolling average of the per-channel error count.

Figure 5:
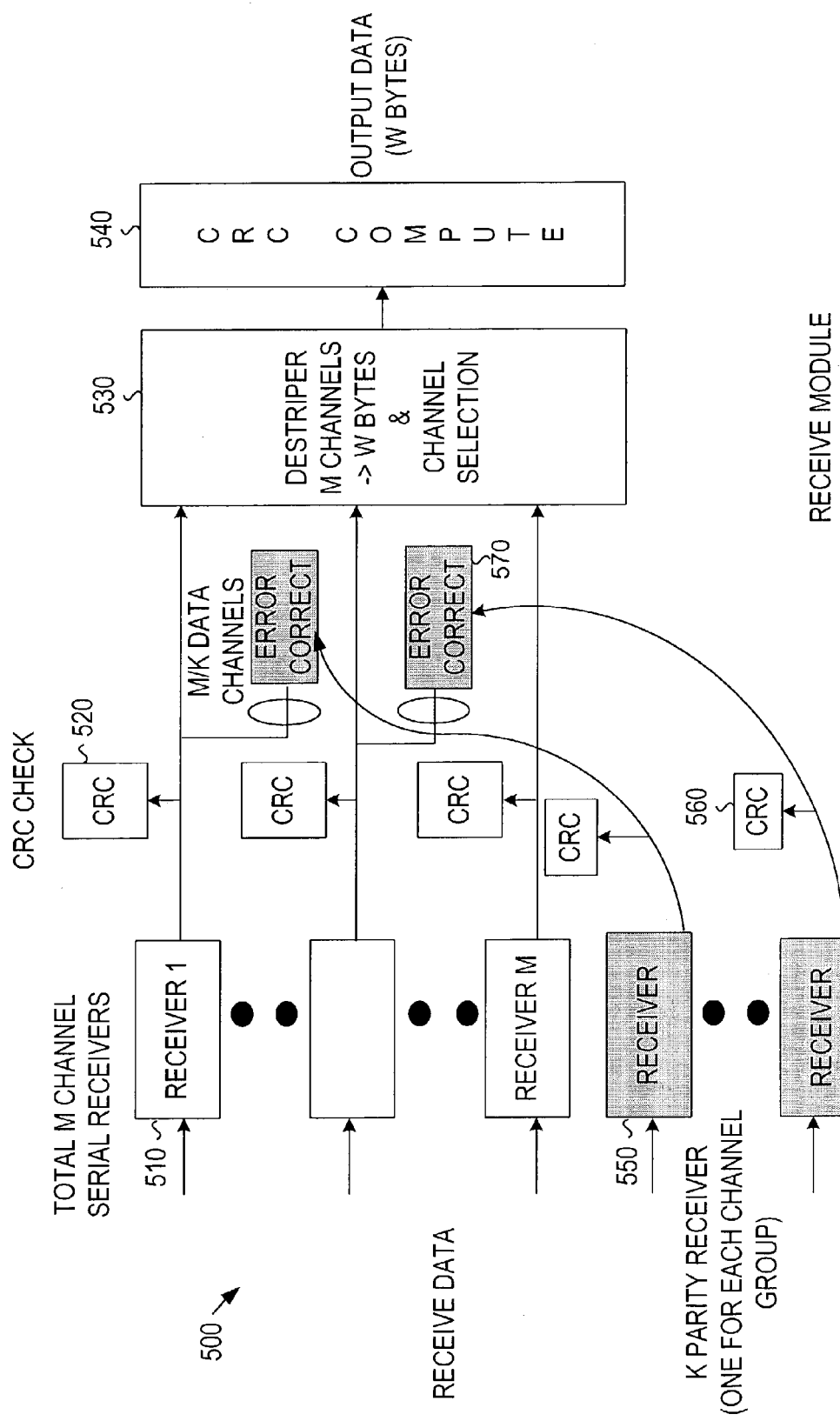
FIG. 5 illustrates an exemplary receiving module, according to one embodiment.

FIG. 5 illustrates an exemplary receive module 500, according to one embodiment. The receive module 500 includes M serial channel receivers 510 for receiving and buffering data over the M data channels. A CRC module 520 generates a CRC for each data channel (stripe). The stripes are provided to a destriper 530 that takes the M channels and converts it back into a W byte (or bit, etc.) frame. The destriper 530 forwards the frame to a CRC computation module 540 that computes the CRC for the entire frame and then compares the generated frame CRC to the transmitted frame CRC, and the generated stripe CRCs to the transmitted stripe CRCs to determine errors. The receive module 500 also includes K serial channel receivers 550 for receiving parity data. A CRC module 560 generates a CRC for each parity channel (stripe). Each parity channel and the data channels that are associated with the parity channel as part of a group, are provided to error correction modules 570. There is one error correction module 570 for each of the M/K groups. The error correction modules 570 can recreate data lost on an individual channel within a group. As previously discussed, the data can be recreated by XORing all of the other channels (data and parity) within the group. Accordingly, in a preferred embodiment, the error correction modules 570 are XOR gates. The error correction modules 570 provide the corrected data channels to the destriper 530.

It should be noted that the receivers 510 and the receivers 550, as well as the CRC modules 520 and the CRC modules 560, are illustrated separately for convenience of pointing out the difference between the parity channels and the data channels. However, it should in no way be construed to require different receivers and CRC modules for parity channels and data channels. Rather, the receivers and CRC modules could be the same type of receivers. In fact, according to one embodiment, the receiver module 500 can easily be reconfigured to have more data channels or more parity channels.

Figure 6:
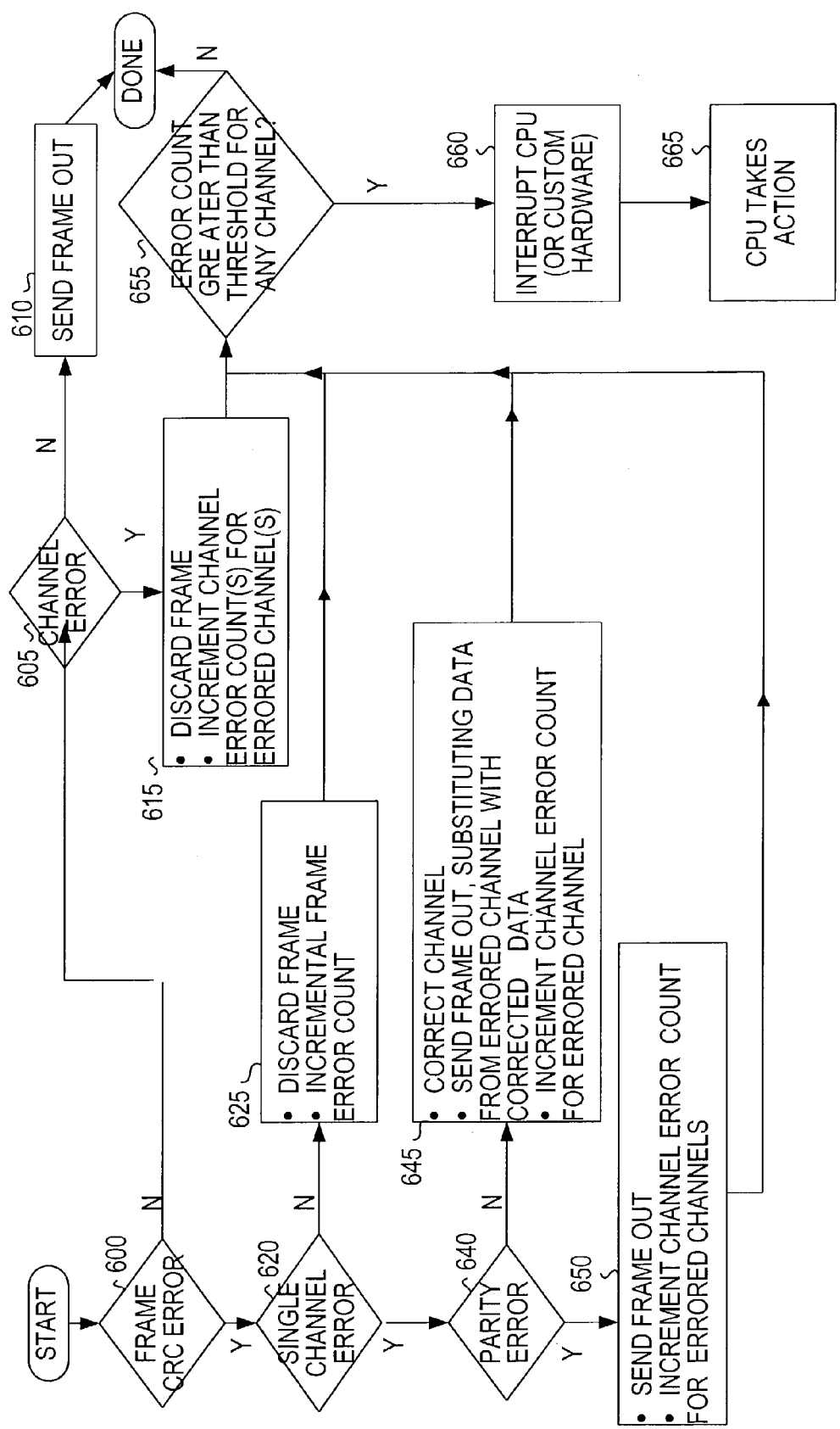
FIG. 6 illustrates an exemplary flowchart of the processing of a frame received over a plurality of channels, according to one embodiment.

FIG. 6 illustrates an exemplary flowchart of the processing of a frame received over a plurality of channels. Initially, the received frame is checked for an error indicated by the frame-level CRC (600). If there is no error in the frame level CRC (600 No), then each individual stripe is checked for errors based on the CRC or an error indication from the physical receiver device (605). If there is no error in any channel (605 No), then the frame is declared good and is sent out for further processing (610). If there are one or more channels with errors (605 Yes), then the error is an uncorrectable error. The frame is discarded and the corresponding per-channel error counters are incremented (615).

If there was a frame level CRC error (600 Yes), then a determination is made to as whether the errors have originated from a single channel or from multiple channels within a group, by checking the corresponding stripe-level CRCs (620). If the errors were not limited to a single channel per group (e.g., more than one channel error in at least one group) the errors are uncorrectable (620 No). The frame is then discarded, the frame error count is incremented, and the channel error counts for the errored channels are incremented (625). If the errors were limited to a single channel per group (620 Yes), a determination is made as to whether the channel having the error is the parity channel (640). If the channel error was not in the parity channel (640 No), then the error was in a data channel. The data in the errored channel is then recreated (corrected) by XORing all the other stripes within that group, the frame is generated using the corrected stripe, the frame is sent out as a good frame, and the channel error count for the errored channel is incremented (645). If the channel error was in the parity channel (640 Yes), the frame is sent out as a good frame, and the parity channel error count is incremented (650).

After any incrementing of channel errors, whether the frames were discarded (615, 625) or the frames were transmitted (645, 650), the error count for each channel is compared to the threshold (655). If the threshold is not exceeded (655 No) for all the channels then the process is complete. If the threshold is exceeded (655 Yes) for at least one channel, an interrupt is issued to a CPU or custom hardware (660), and the CPU (custom hardware) takes appropriate action (665). Appropriate action includes the CPU (custom hardware) shutting down the system so that the fault with that serial channel (e.g., backplane, card) can be fixed. The CPU (custom hardware) may shut the system down at that point in time or may opt to allow the system to continue for now and shut the system down at some point in the future (e.g., time associated with less traffic) to make the repair. If there are more than one channel per group experiencing excessive failures (enough to exceed the threshold) it is likely that the system will be shut down at that point as with more than one channel failing the errors cannot be corrected. If it is only a single channel that has exceeded the threshold, then an operator may decide to continue operating at that point and plan to fix the channel at a point later in time. That is, the data from the single channel experiencing all the errors will be able to continue to be recreated (corrected) as long as it is the only channel experiencing an error within that group.

The exemplary process flow described above is not the only embodiment but is merely an example. Numerous modifications could be made to the process flow (e.g., the order could be rearranged and/or individual operations could be combined or split apart).

Fixing a channel may cause down time on the system as without the channel being available data cannot be striped effectively. Downtime should be avoided. According to one embodiment, the CPU (custom hardware) may switch from a single channel error correction mode (the mode described above where a single channel error per group can be corrected) to a graceful degradation mode. A graceful degradation mode uses all channels for data so that correction of channel failures cannot be performed. However, in the event of a failure of a channel (e.g., exceeds threshold number of failures) the system can be reconfigured to not utilize that channel when striping the data (striping the data over fewer channels). If there are a total of N channels, the data is striped bytewise (bitwise, etc.) over the N channels. However, there is a provision for the data to be striped over fewer channels (N–1 channels, N–2 channels, etc.). In general, the data can be striped over any number of channels in the range N–P (minimum) to N (maximum). This allows for P channels to fail, and still have data transmission over the backplane and through the switching chips to the destination line card, albeit at a reduced bandwidth. The value of P is determined by the reduction of throughput that can be tolerated.

Figure 7:
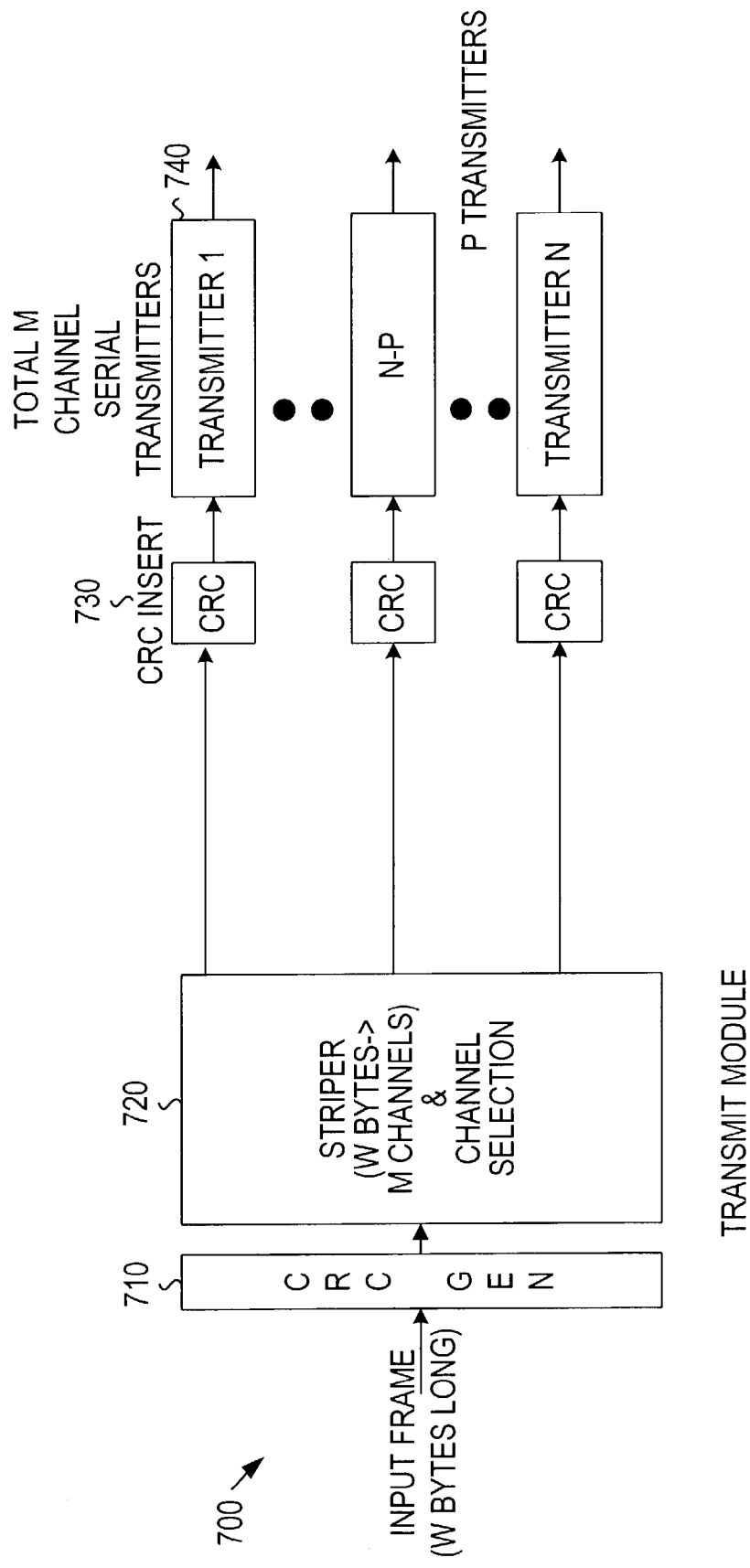
FIG. 7 illustrates an exemplary transmission module, according to one embodiment.

FIG. 7 illustrates an exemplary transmission module 700, according to one embodiment. The transmission module 700 is much like the transmission module 400 of FIG. 4 with the exception that there are no parity bits generated or transmitted. A CRC generator 710 receives a frame and generates a CRC for the entire frame. The entire frame including the CRC is provided to a striper 720. The striper 720 divides the frame into N groups and selects the channel for each group to be transmitted over. A CRC is generated for each stripe and is inserted at the end of the stripe by a CRC module 730. The stripe and the associated CRC for each channel are then provided to a transmitter 740 for transmitting over the backplane. There are a total of N transmitters 740, one for each data channel. In the event of channel failures the transmission module can be reconfigured to stripe the data over fewer channels. Up to P channels can be configured out of the system so that the data can be striped over a minimum of N–P channels.

Figure 8:
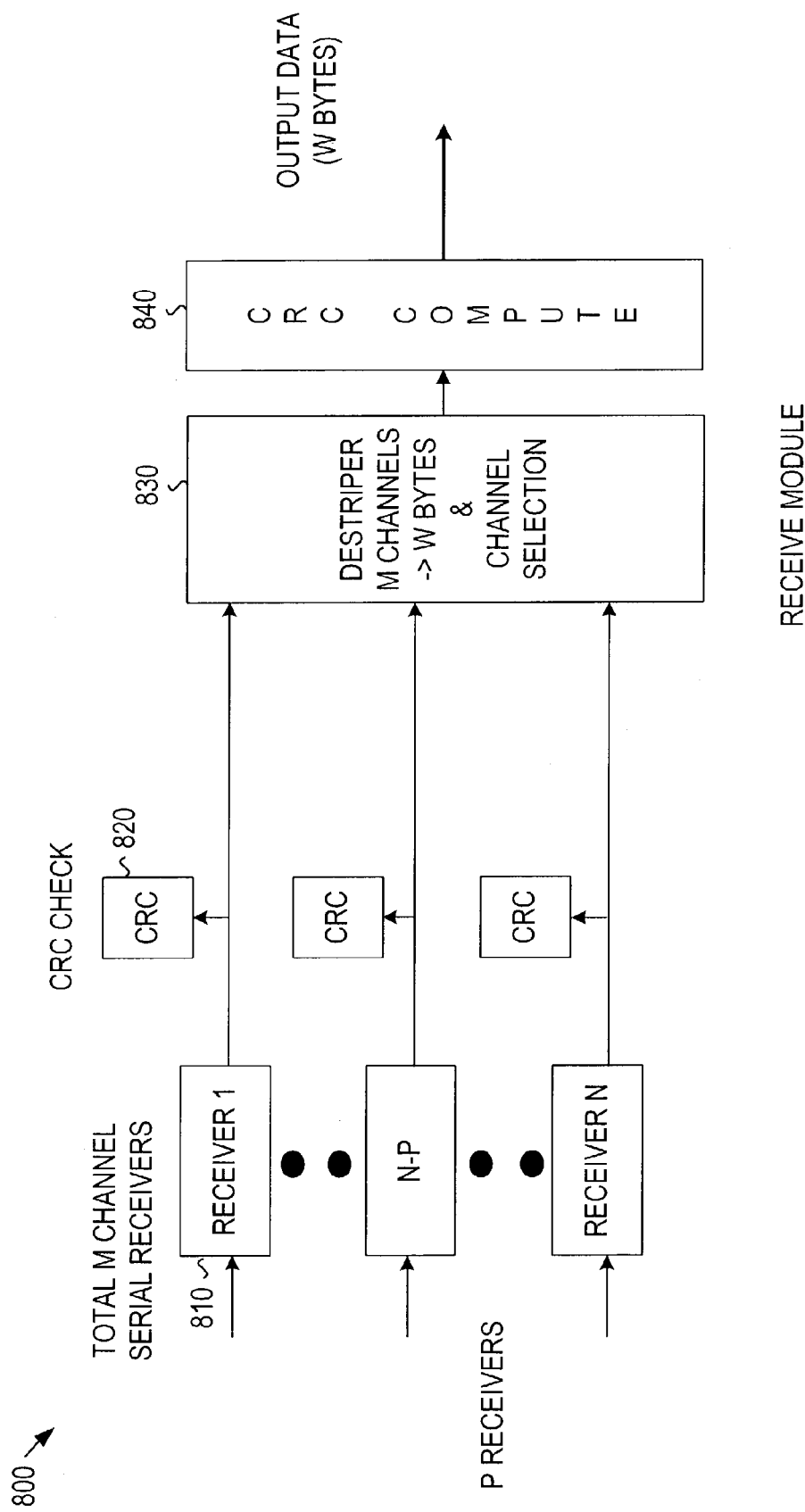
FIG. 8 illustrates an exemplary receiving module, according to one embodiment.

FIG. 8 illustrates an exemplary receive module 800, according to one embodiment. The receive module 800 is much like the receive module 500 of FIG. 5 with the exception that there are no parity bits received and no regeneration (correction) of errored stripes. N serial channel receivers 810 receive and buffer data from N data channels. There are a total of N receivers 810, one for each data channel. In the event of channel failures the receive module 800 can be reconfigured to receive the data over fewer channels. Up to P channels can be configured out of the system so that the striped data can be transmitted using as little as N–P channels (minimum number of channels). A CRC module 820 generates a CRC for each data channel (stripe). The stripes are provided to a destriper 830 that converts the stripes back into a frame. The destriper 830 forwards the frame to a CRC computation module 840 that computes the CRC for the entire frame and then compares the generated frame CRC to the transmitted frame CRC, and the generated stripe CRCs to the transmitted stripe CRCs to determine errors. Errors in any channel are recorded and compared to an error threshold. If the channel exceeds the error threshold it is configured out of the system until it can be repaired.

Figure 9A:
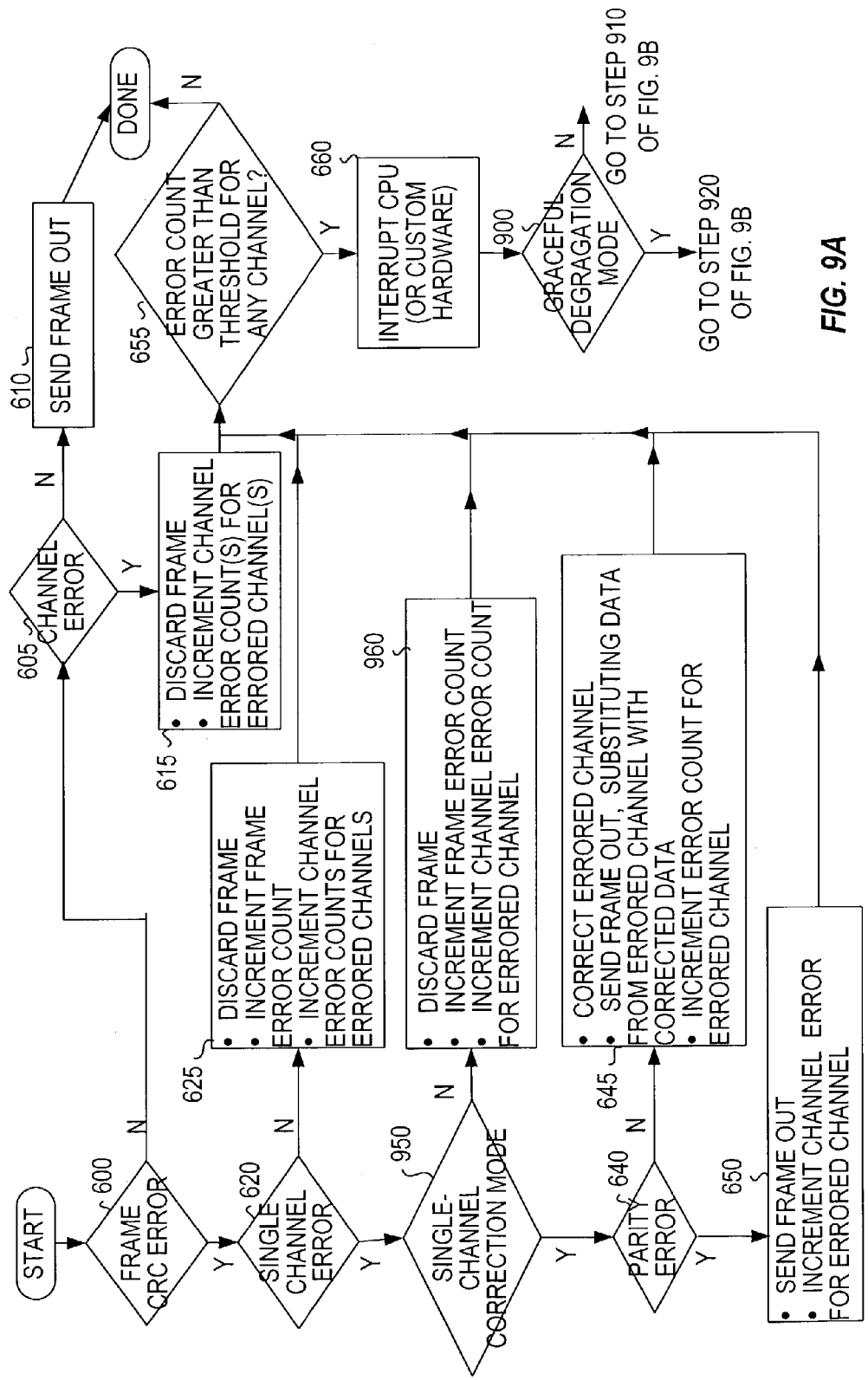
FIGS. 9A and B illustrate an exemplary flowchart of the processing of a frame received over a plurality of channels, according to one embodiment.
Figure 9B:
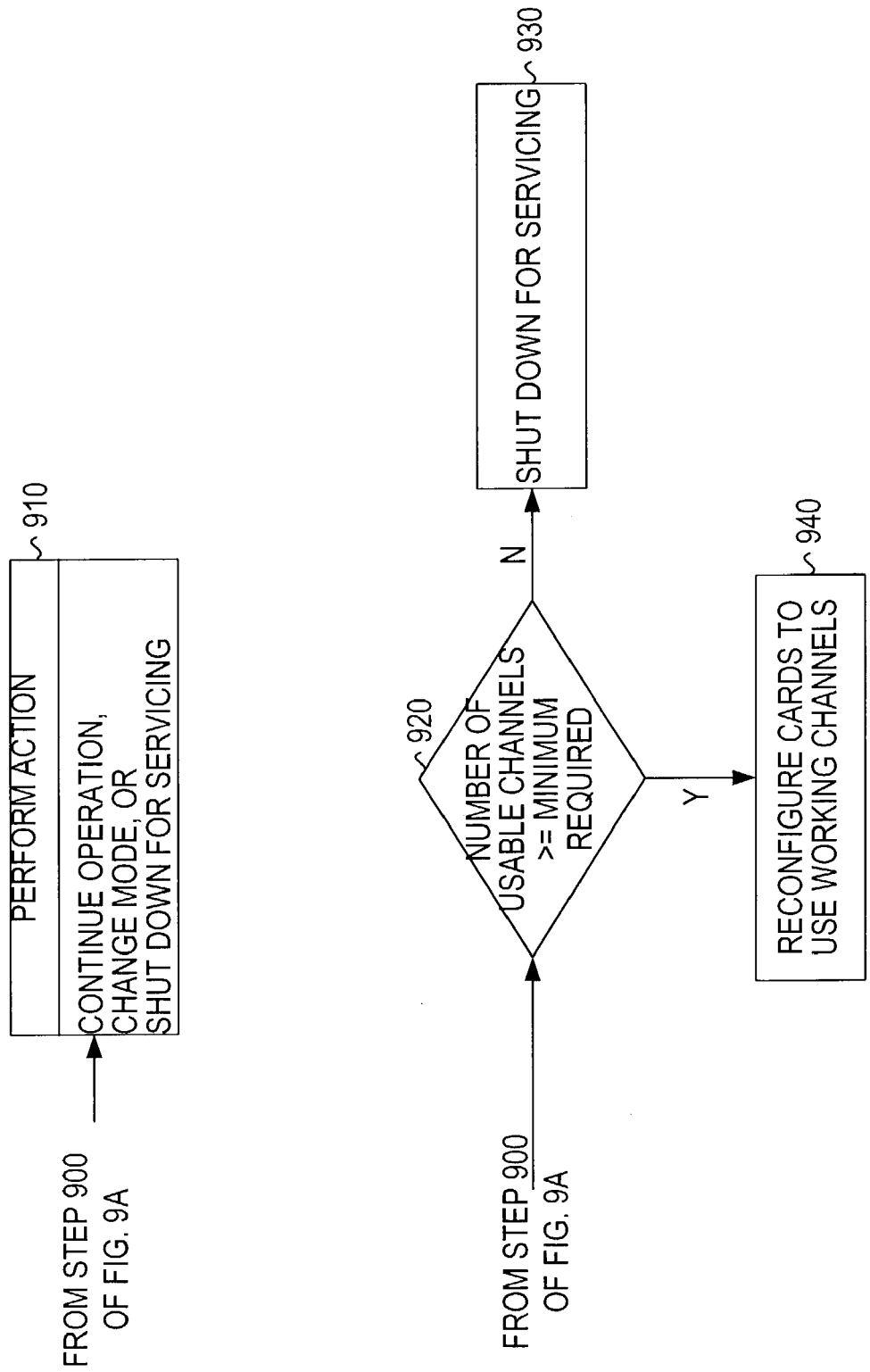

FIGS. 9A and B illustrate an exemplary flowchart of the processing of a frame received over a plurality of channels. The flowcharts of FIGS. 9A and B are similar to the flowchart of FIG. 6 with the exception that a switch from single channel error correction mode (described above) to graceful degradation mode (described above) is possible. The mode of the system may be switched at any point in time either automatically or by an operator. One possible occasion for the switch in mode would be the case where the error threshold has been exceeded for at least one channel and the operator does not want to shut the system down to repair the channel(s) at that point. In this case the system would reconfigure itself to exclude that channel and processing would continue. As noted above, in the graceful degradation mode fixing single channel errors cannot be performed. Referring to the process flow, in this embodiment, after the CPU (custom hardware) receives an interrupt (650) indicating that a threshold(s) has been exceeded a determination will be made as to whether the system is in graceful degradation mode (900). If the system is not in graceful degradation mode (900 No), the CPU (custom hardware) will perform the necessary actions (910). The necessary actions may be to shut down and repair the system now, tag the system for shut down/repair in the future, or switch to graceful degradation mode where the striping is modified to transmit the data over the error-free channels only.

If the system was in graceful degradation mode (900 Yes), a determination will be made as to whether there are enough usable channels remaining to support the system (920). That is, if we take the faulty channel out of service are the number of channels remaining at least equal to the minimum number of channels (N–P) required to meet the bandwidth requirements of the system. If the number of channels remaining after deactivating the faulty channels is less than the minimum number of channels (920 No), then the system is shut down for servicing (930). If the number of channels remaining after deactivating the faulty channels is still at least equal to the minimum number of channels (920 Yes), then the system is reconfigured to utilize only working channels (940).

As previously stated the graceful degradation mode does not support correction of errors. Accordingly, a determination should be made as to whether the system is in single-channel error correction mode (950). Note that this determination is illustrated as being made between the single error determination 620 and the determination 640 of whether the errored channels is a data channel or a parity channel. If it is determined that the system is not in single channel error correction mode (950 No) the frame is discarded, the frame error count is incremented and the channel error count for the errored channel is incremented (960). The process would then proceed to the error threshold determination (655) previously discussed. If it is determined that the system is in single channel error correction mode (950 Yes) then the system proceeds to the determination 640 of whether the errored channel is a data channel or a parity channel, as previously discussed.

According to one embodiment, there is also a provision for test data to be sent over one or more channels. Errors detected on the received data are recorded per-channel. This can be used by the CPU (or custom hardware) to test individual channels before deciding the number of channels to use, or as a periodic self-diagnostic feature.

The exemplary process flow described above is not the only embodiment but is merely an example. Numerous modifications could be made to the process flow (e.g., the order could be rearranged, individual operations could be combined or split apart).

According to another embodiment, the system may act in both the single channel error correction mode and the graceful degradation mode at the same time. This embodiment is similar to the embodiment of FIGS. 9A & B with the exception that the graceful degradation determination 900 and associated perform action 910, as well as single channel error correction determination 950 and associated discard frame 960 are no longer required. The system will utilize both data and parity channels so that single channel error corrections can be made. In the event that one or more of the channels exceed the associated thresholds 655, the CPU (custom hardware) will make a determination if there are sufficient channels available to deactivate the errored channel or channels 920. In this embodiment, the determination is not just made on data channels as in the embodiment of FIGS. 9A & B (at least N–P channels). In this embodiment, a determination will have to be made as to whether enough data channels are available with enough associated parity channels to be able to handle single channel error detection. Therefore a minimum number of data channels and associated parity channels need to be defined. According to one embodiment, it would be possible to continue processing if there were channels to support the data but not the parity. However, the continued processing would be with limited or no single error correction. If the determination is that enough channels do not exist (920 No) then the system is shut down for servicing (930). If the determination is made that there are enough channels available, the system is reconfigured to use only the working channels (940).

Figure 10:
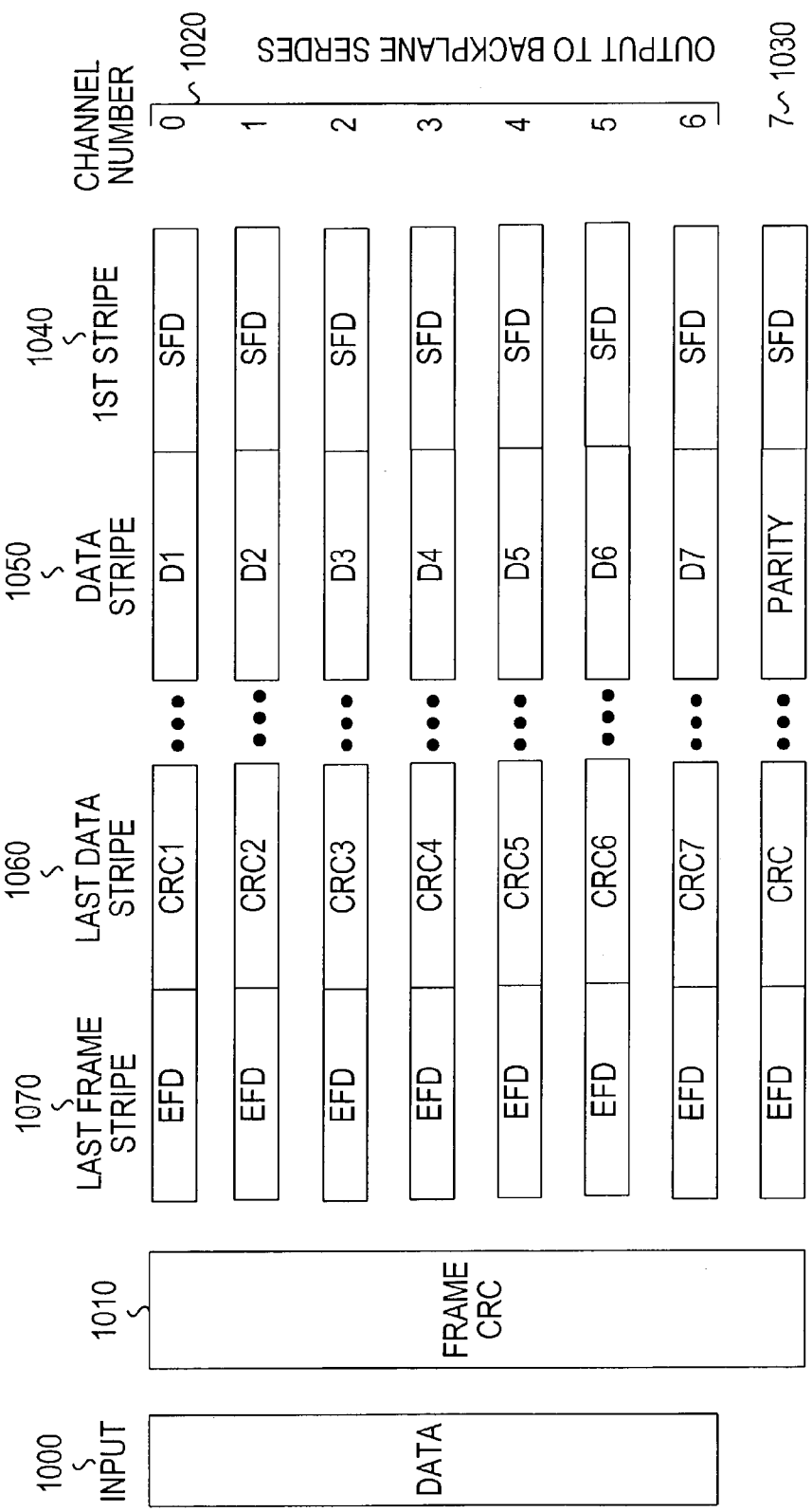
FIG. 10 illustrates an exemplary frame and stripe format, according to one embodiment.

FIG. 10 illustrates an exemplary frame and stripe format. In this example, high speed serial electrical channels are used over a backplane, and switched using a crossbar. There are total of eight serial channels with seven channels used for data and one channel used for parity. All seven data channels belong to one group so that only a single parity channel is required to provide error correction for the seven data channels. The encoding scheme used for framing is the industry-standard 8-bit to 10-bit encoding. It provides a "Start of Frame Delimiter" (SFD) symbol, an "End of Frame Delimiter" (EFD) symbol, and an "Idle Character" symbol. The input data 1000 is broken into frames, and each frame is appended with a frame-level CRC 1010. The frame-level CRC 1010 is computed over all the data bytes (or bits, etc.) of the frame. The data is striped over the seven data channels 1020, byte by byte. The data can be striped across the channels in other manners, such as bit by bit or group by group. A parity channel 1030 transmits parity data for the group which is the XOR of all the data from the seven data channels. According to a preferred embodiment, the parity data is derived by the bit-wise XOR of the corresponding bytes of each of the seven data channels.

Each of the channels initially transmits a first stripe for the frame 1040 that is the start of frame symbol. This is followed by the data stripe (data for the seven data channels 1020 and parity data for the parity channel 1030) 1050. A last data stripe 1060 is the CRC computed for each stripe. A last stripe for the frame 1070 is the end of frame symbol. If only a single channel fails, the channel can be recreated (fixed) by XORing all the other channels in the group. If one of the channels records enough errors to cross the threshold level, the system could either shut down for servicing (now or later) or could reconfigure itself to a graceful degradation mode in which case that channel would be reconfigured out of the system and the data would be transmitted over the remaining channels.

According to an embodiment in which the system can be reconfigured between single channel error correction mode and graceful degradation mode, if a single channel failed once the system was reconfigured to remove the channel (whether a data channel or the parity channel) the data would continue be transmitted over seven channels but would have no parity channel and thus no error correction.

According to an embodiment in which the system supports both single channel error correction mode and graceful degradation mode, the system can continue to correct errors while at the same time reconfiguring to deactivate faulty channels. For example, if a data channel failed the data could be striped over the remaining six data channels and the parity channel could continue be used for error correction. However, if the system needed at least six data channels to meet bandwidth requirements if a second channel failed the parity channel would have to be deactivated which would eliminate the error correction capability at that point.

Although the detailed description has been illustrated by reference to specific embodiments, various changes and modifications may be made. Reference in the specification to "one embodiment" or "an embodiment" means that a particular feature, structure or characteristic described in connection with the embodiment is included in at least one embodiment. Thus, the appearances of the phrase "in one embodiment" appearing in various places throughout the specification are not necessarily all referring to the same embodiment.

Different implementations may feature different combinations of hardware, firmware, and/or software. For example, some implementations feature computer program products disposed on computer readable mediums. The programs include instructions for causing processors to perform techniques described above.

The various embodiments are intended to be protected broadly within the spirit and scope of the appended claims.

The invention claimed is:

1. An apparatus, comprising:
   a transmission module to split a data segment into a plurality of data stripes and transmit each data stripe over an associated data channel, wherein the plurality of data channels are organized into at least one group and each group has an associated parity channel to transmit a parity stripe, the parity stripe being generated based on the data stripes within the group;
   a reception module to receive the plurality of data stripes over the appropriate data channels and the at least one parity stripe over the parity channel and to recreate the data segment based on the received data stripes, wherein said reception module checks for errors within each stripe, and wherein said reception module tracks number of errors per serial channel and compares to a threshold; and
   a controller to control the operation of the apparatus, wherein said controller deactivates a serial channel if the number of errors in the serial channel exceeds the threshold and informs said transmission module and said reception module of the deactivation,
   wherein said transmission module reconfigures generation of data stripes and parity stripes to either split the data segment into less data stripes or reduce number of parity stripes generated, and wherein said transmission module transmits the reconfigured combination of data stripes and parity stripes over the remaining serial channels, and
   wherein said reception module receives the reconfigured combination of data stripes and parity stripes over the remaining serial channels and recreates the data segment based on the received data stripes.

2. The apparatus of claim 1, wherein said transmission module generates the parity stripe for a group by XORing each of the associated data stripes within the group.

3. The apparatus of claim 1, wherein said transmission module generates an error code for each stripe and transmits the error code along with the stripe.

4. The apparatus of claim 3, wherein the error code is a cyclic redundancy code (CRC).

5. The apparatus of claim 1, wherein said reception module checks for errors by computing an error code for each stripe and comparing it to a transmitted error code.

6. The apparatus of claim 1, wherein said reception module discards the data segment if more than one stripe in a group contains errors.

7. The apparatus of claim 1, wherein said reception module recreates a data stripe containing errors by XORing each of the other data stripes and the parity stripe within the group.

8. A store and forward device for striping data over a plurality of serial channels, the device comprising:
- a plurality of interface cards to receive and transmit data;
- a backplane connecting the plurality of cards together via a plurality of serial channels;
- a transmission module to split a data segment into a plurality of data stripes and transmit each data stripe over an associated data channel, wherein the plurality of data channels are organized into at least one group and each group has an associated parity channel to transmit a parity stripe, the parity stripe being generated based on the data stripes within the group;
- a reception module to receive the plurality of data stripes over the appropriate data channels and the at least one parity stripe over the parity channels, to check for errors within each stripe, and to recreate the data segment based on the received data stripes; and
- a controller to control the operation of the apparatus, wherein said controller deactivates a serial channel if the number of errors in the serial channel exceeds a threshold and informs said transmission module and said reception module of the deactivation,
- wherein said transmission module reconfigures generation of data stripes and parity stripes to either split the data segment into less data stripes or reduce number of parity stripes generated, and wherein said transmission module transmits the reconfigured combination of data stripes and parity stripes over the remaining serial channels, and
- wherein said reception module receives the reconfigured combination of data stripes and parity stripes over the remaining serial channels and recreates the data segment based on the received data stripes.

9. The device of claim 8, wherein
said transmission module generates an error code for each stripe and transmits the error code along with the stripe; and
said reception module checks for errors by computing an error code for each stripe and comparing it to a transmitted error code.

10. The device of claim 8, wherein said reception module discards data segment if more than one data stripe in a group contains errors.

11. The device of claim 8, wherein said interface cards are Ethernet cards.

12. An apparatus, comprising:
- a transmission module to split a data segment into a plurality of data stripes, generate an error code for each data stripe, and transmit the data stripes and the associated error codes over associated serial channels;
- a reception module to receive the data stripes and the associated error codes over the associated serial channels, compute error codes for each data stripe, compare the computed error codes to the transmitted error codes to detect errors, to recreate the data segment based on the received data stripes, and to track number of errors per serial channel; and
- a controller to control the operation of the apparatus, wherein said controller deactivates a serial channel if the number of errors in the serial channel exceeds a threshold and informs said transmission module and said reception module of the deactivation,
- wherein said transmission module reconfigures generation of data stripes to split the data segment into less data stripes, and wherein said transmission module transmits the reconfigured data stripes over the remaining serial channels, and
- wherein said reception module receives the reconfigured data stripes over the remaining serial channels and recreates the data segment based on the received data stripes.

13. The apparatus of claim 12, wherein the error code computed for each stripe is a cyclic redundancy code (CRC).

14. The apparatus of claim 12, wherein said reception module recreates the data segment by combining each of the received data stripes.

15. The apparatus of claim 12, wherein the error code computed for each data segment is a cyclic redundancy code (CRC).

16. The apparatus of claim 12, wherein
said transmission module generates an error code for the data segment and transmits the data segment error code at end of the data segment; and
said reception module generates an error code for the recreated data segment and compares it to the transmitted data segment to check for errors within the data segment.

17. The apparatus of claim 12, wherein
said transmission module organizes the plurality of data channels into at least one group and each group has an associated parity channel to transmit a parity stripe to be utilized for error correction, the parity stripe being generated based on the data stripes within the group; and
said reception module recreates an errored data stripe by using the parity stripe and remaining data stripes within a group, if only a single data stripe within the group is errored.

18. An apparatus, comprising:
- a transmission module to stripe data segments over a plurality of serial channels, wherein striping includes splitting the data segments into a plurality of data stripes, adding error detection to the data stripes, creating at least one parity stripe for the data stripes, and transmitting the plurality of data stripes and the at least one parity stripe over the plurality of serial channels;
- a reception module to receive the data stripes and the at least one parity stripe over the plurality of serial channels and to recreate the data segment based on the received data stripes, wherein said reception module checks for errors within each data stripe and can correct for single data stripe errors using the parity stripe, and wherein said reception module tracks number of errors per serial channel; and
- a controller to control the operation of the apparatus, wherein said controller deactivates a serial channel having the number of errors exceed a threshold and informs said transmission module and said reception module of the deactivation, wherein said transmission module reconfigures generation of data stripes and parity stripes to either split the data segment into less data stripes or reduce number of parity stripes generated, and wherein said transmission module transmits the reconfigured combination of data stripes and parity stripes over the remaining serial channels, and wherein said reception module receives the reconfigured combination of data stripes and parity stripes over the remaining serial channels and recreates the data segment based on the received data stripes.

19. The apparatus of claim 18, wherein said transmission module creates the parity stripe by XORing associated data stripes.

20. The apparatus of claim 18, wherein the error detection is a cyclic redundancy code (CRC).

21. The apparatus of claim 18, wherein said reception module checks for errors by computing an error code for each stripe and comparing it to a transmitted error code.

22. The apparatus of claim 18, wherein said reception module discards the data segment if more than one stripe in a group contains errors.

23. The apparatus of claim 18, wherein said reception module recreates a data stripe containing errors by XORing each of the other data stripes and the parity stripe within the group.

24. A method comprising:
striping data segments over a plurality of serial channels, wherein said striping includes splitting the data segments into a plurality of data stripes and adding error detection to the data stripes;
creating at least one parity stripe for the data stripes making up a data segment;
transmitting the parity stripe along with the data stripes;
receiving the data stripes and the at least one parity stripe over the plurality of serial channels;
checking for errors within each data stripe;
correcting single data stripe errors using the parity stripe;
recreating the data segment based on the received data stripes;
tracking number of errors per serial channel and if the number of errors exceed a threshold for a particular serial channel;
deactivating the particular serial channel;
modifying number of data stripes data segments are split into or number of parity stripes created for data segments;
transmitting the modified combination of data stripes and parity stripes over the remaining serial channels;
receiving the modified combination of data stripes and parity stripes over the remaining serial channels; and
recreating the data segment based on the received data stripes.

25. The method of claim 24, wherein said creating includes XORing associated data stripes.

26. The method of claim 24, wherein the error detection is a cyclic redundancy code (CRC).

27. The method of claim 24, wherein said checking includes computing an error code for each stripe and comparing it to a transmitted error code.

28. The method of claim 24, further comprising discarding the data segment if more than one stripe in a group contains errors.

29. The method of claim 24, further comprising recreating a data stripe containing errors by XORing each of the other data stripes and the parity stripe within the group.

30. An apparatus, comprising:

a transmission module to split a data segment into a plurality of data stripes and transmit each data strip over an associated serial channel;
a reception module to receive the plurality of data stripes over the associated serial channels, to recreate the data segment based on the received data stripes, to check the data stripes for errors, and track number of errors per serial channel; and
a controller to monitor the number of errors per serial channel and compare to a threshold, wherein if the threshold is exceeded for a certain serial channel said controller deactivates the certain serial channel and informs said transmission module and said reception module of the deactivation, wherein said transmission module reconfigures generation of data stripes to split the data segment into less stripes, and wherein said transmission module transmits the reconfigured data stripes over the remaining serial channels, and wherein said reception module receives the reconfigured data stripes over the remaining serial channels and recreates the data segment based on the received data stripes.

31. The apparatus of claim 30, wherein
said transmission module generates an error code for each stripe and transmits the error code along with the data stripe; and
said reception module checks for errors by computing an error code for each data stripe and comparing it to a transmitted error code.

32. The apparatus of claim 30, wherein
said controller organizes the data stripes into at least one group;
said transmission module generates a parity stripe for each of the at least one group by XORing each of the associated data stripes within the group; and
said reception module recreates a data stripe containing errors if the data stripe is only data stripe within an associated grouping containing errors by XORing the other data stripes and the parity stripe within the group.

33. An apparatus, comprising:
a transmission module to split a data segment into a plurality of data stripes, organize the plurality of data stripes into at least one group, generate a parity stripe for each group based on the data stripes within the group, and transmit the plurality of data stripes and the at least one parity stripe over associated serial channels;
a reception module to receive the plurality of data stripes and the at least one parity stripe from the associated serial channels, recreate the data segment based on the received data stripes, check for errors in the plurality of data stripes and the at least one parity stripe, and track number of errors per serial channel; and
a controller to monitor the number of errors per serial channel and compare to a threshold, wherein if the threshold is exceeded for a certain serial channel said controller deactivates the certain serial channel and informs said transmission module and said reception module of the deactivation, wherein said transmission module reconfigures generation of data stripes and parity stripes to either split the data segment into less data stripes or reduce number of parity stripes generated, and wherein said transmission module transmits the reconfigured combination of data stripes and parity stripes over the remaining serial channels, and wherein said reception module receives the reconfigured combination of data stripes and parity stripes over the remaining serial channels and recreates the data segment based on the received data stripes.

34. The apparatus of claim 33, wherein said transmission module generates an error code for each stripe and transmits the error code along with the stripe; and said reception module checks for errors by computing an error code for each stripe and comparing it to a transmitted error code.

35. The apparatus of claim 33, wherein said transmission module generates the parity stripe for each of the at least one group by XORing each of the associated data stripes within the group; and said reception module recreates a data stripe containing errors if the data stripe is only data stripe within an associated grouping containing errors by XORing the other data stripes and the parity stripe within the group.

36. The apparatus of claim 33, wherein said transmission module generates an error code for the data segment and transmits the error code over the serial channels, wherein said reception module computes an error code for the data segment after the segment is recreated and compares to the received error code.

37. The apparatus of claim 36, wherein said reception module discards the data segment if there is an error in the data segment but not in any data stripe or if there is an error in a data stripe but not in the data segment.

* * * * *